April 12, 1960     H. W. GUNBERG     2,932,443
ACCESSORY DRIVE

Filed Aug. 17, 1956     2 Sheets-Sheet 1

INVENTOR
HARRY W. GUNBERG
BY Charles Warren
ATTORNEY

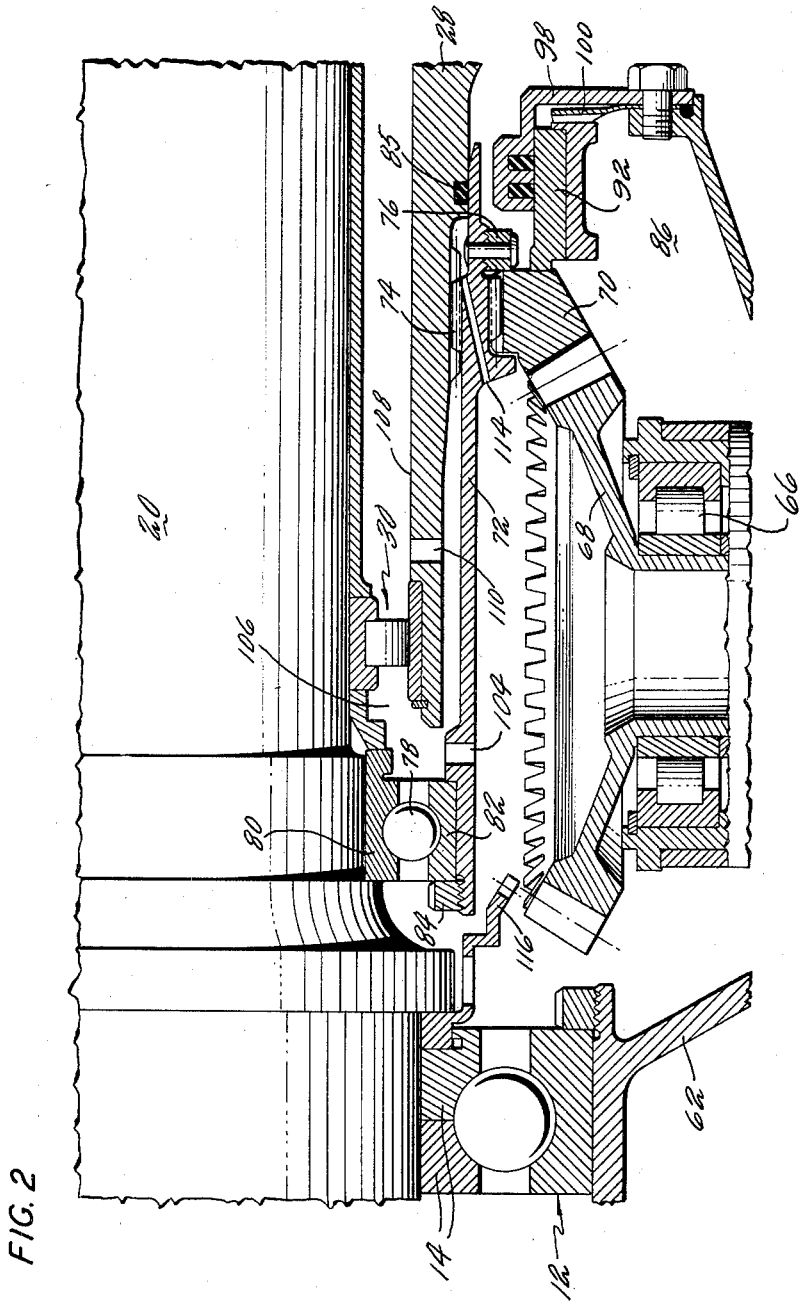

2,932,443

ACCESSORY DRIVE

Harry W. Gunberg, West Hartford, Conn., assignor to United Aircraft Corporation, East Hartford, Conn., a corporation of Delaware Application August 17, 1956, Serial No. 605,685

10 Claims. (Cl. 230—122)

The present invention relates to a gas turbine power plant in which there are independent high pressure and low pressure compressor rotors.

One feature of the invention is an arrangement for driving an accessory gear from one of the rotors without restricting the thermal expansion of either of the rotors in operation. Another feature is an arrangement for driving the accessory gear from one of the rotors without applying any axial thrust load to said rotor.

Where the rotors are concentric such that one rotor shaft extends through and rotates with respect to the other shaft, it is desirable to support the shafts in concentric relation to each other by an intershaft bearing since, if both shafts rotate in the same direction, this bearing will then operate at a relatively low speed as compared to a bearing supporting the shaft with respect to the surrounding stationary structure. One feature of the invention is the incorporation of the accessory drive at the end of the shaft that is supported by an intershaft bearing. Another feature is the incorporation of seals by which to enclose the bearing and accessory drive within a chamber that is substantially lubricant tight.

Other objects and advantages will be apparent from the specification and claims, and from the accompanying drawings which illustrate an embodiment of the invention.

Fig. 2 is a fragmentary sectional view on a larger scale of a part of the device of Fig. 1.

Figure 1:
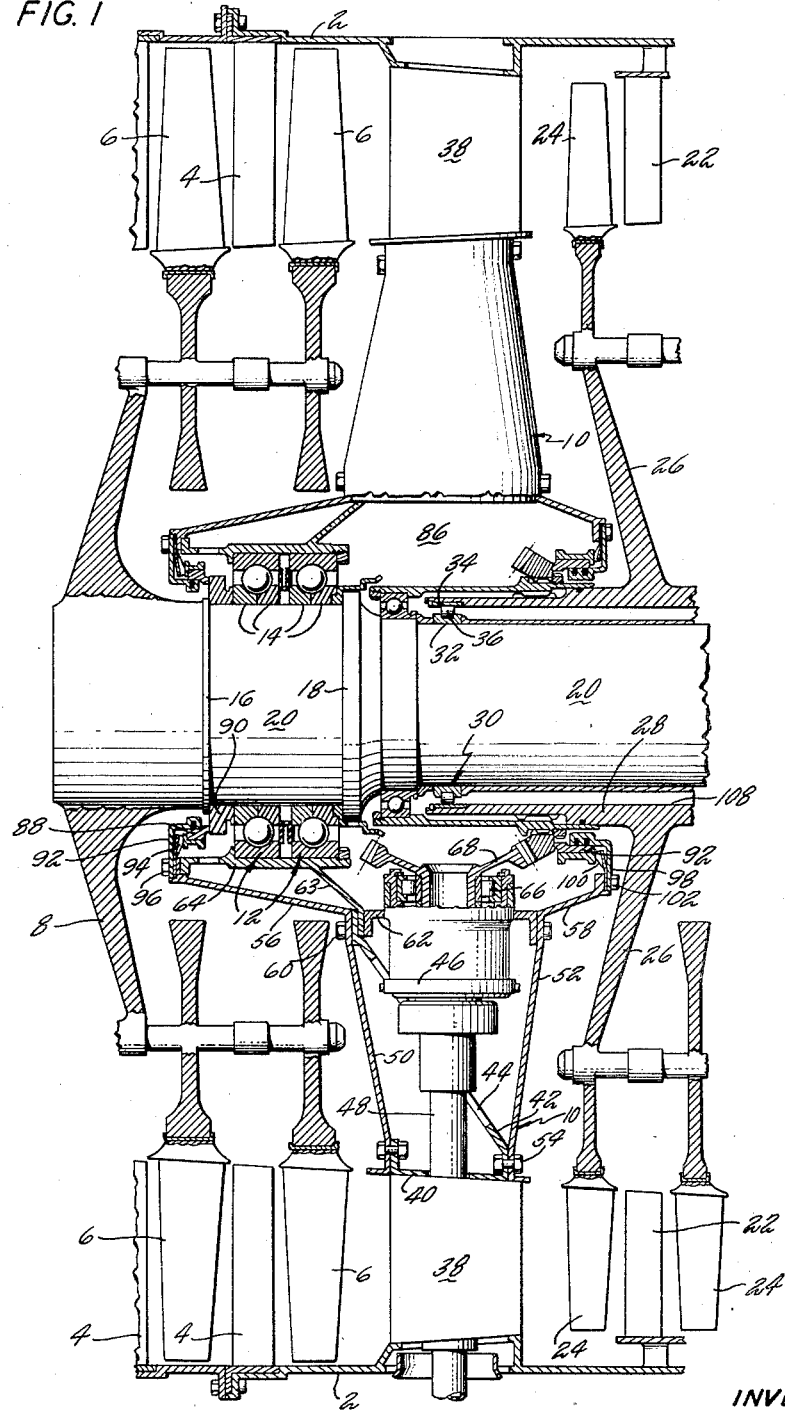
Fig. 1 is a sectional view through the housing which supports the shafts and is located between the low and high pressure rotors.

The invention is shown in connection with a split compressor of the type shown, for example, in the Savin Patent No. 2,747,367. The outer casing 2 supports stationary vanes 4 which alternate with rows of blades 6 on the low pressure compressor rotor 8 which is located upstream of the intermediate housing 10. This housing extends inwardly from the casing 2 and supports bearings 12 by which the low pressure rotor is located concentrically within the casing. These bearings not only support the radial load of the low pressure compressor rotor but are also designed as thrust bearings by which to hold the compressor rotor 8 axially in position within the casing. To this end, the inner races 14 of the bearings are clamped between flanges 16 and 18 on the shaft 20 for the rotor.

Downstream of the housing 10 the casing 2 carries one or more rows of stator vanes 22 alternating with rows of blades 24 on the high pressure rotor 26. This rotor has a shaft 28 which surrounds the shaft 20 and is supported in concentric relation thereto by the intershaft radial bearing 30. The inner race 32 of the bearing 30 is held in position axially on the shaft 20 and the outer race 34, which is a sleeve, is held within the end of the outer shaft 28 and is free to move axially with respect to the inner race and the bearing elements 36 in order that the rotor 26 may be free to expand axially at this point. It will be understood that the rotor 26 is supported by another bearing downstream of the bearing 30 which functions to hold the rotor 26 against axial movement at that point with respect to the surrounding supporting structure.

The housing 10 includes a number of radially extending vanes 38 projecting inwardly from the casing 2 and suitably attached thereto. The inner ends of the vanes 38 are interconnected by a ring 40 which has an obliquely extending inwardly projecting flange 42. This flange has openings 44 therein to receive the bearing support 46 for a radially extending accessory shaft 48.

The housing 10 also includes discs 50 and 52 which are attached as by bolts 54 at their outer edge to the ring 40 and which carry at their inner ends oppositely extending frusto-conical elements 56 and 58. The discs 50 and 52 are attached as by bolts 60 at their inner ends to a ring 62 to which is attached the bearing support 46. The bolts also support, through the projecting flange 63, a bearing support ring 64 for the radial and thrust bearings 12. The support ring 64 is also bolted to the upstream end of the element 56. This structure thus supports the bearings 12 against axial movement as well as radial movement with respect to the housing 10.

The support 46 has bearings 66 for the accessory shaft 48 which carries on its inner end an accessory drive gear 68. This gear is in mesh with a gear 70 which is driven from the high pressure rotor shaft 28. To accomplish this, the gear 70 is splined to a sleeve 72, Fig. 2, which surrounds the end of the shaft 28 and is driven from the shaft 28 by splines 74. The gear 70 is held securely on the sleeve 72 as by a clamping ring 76. The sleeve 72, however, is axially slidable with respect to the shaft 28 and the splines 74 are constructed to permit this axially slidable movement.

A radial and thrust bearing 78 mounted on the inner shaft 20 and having its inner race 80 secured against axial movement thereon, has its outer race 82 held to the inner surface of the sleeve 72 as by a clamping ring 84. The thrust bearing 78 is closely adjacent to the bearings 12 and accordingly the sleeve 72 is secured against any axial movement and is therefore held in predetermined relation to the axis of the gear 68 so that this gear and gear 70 are in proper mesh at all times. However, since the end of the shaft 28 can move axially with respect to the sleeve 72, it is apparent that thermal expansion of the shaft 28 in an axial direction is permitted without interfering with the proper operation of the accessory drive. A packing ring 85 in a groove in shaft 28 downstream of the splines 74 prevents oil leakage past the splines.

The bearings 12 and the accessory drive gears are located within a chamber 86 provided by the housing and arranged to prevent the escape of lubricant therefrom. This chamber is defined by the ring 62, the frusto-conical element 56, a seal 88 and a ring 90 on the shaft 20. Downstream of the ring 62, the chamber is defined by the element 58, and a seal 92 which engages with the gear 70.

The seal 88 is axially slidable on a cylindrical surface provided by a supporting ring 92 and is urged axially against the ring 90 by a wave spring 94. The support ring 92 and wave spring 94 are secured as by bolts 96 to the inner end of the element 56. These bolts also engage with the upstream end of the bearing supporting sleeve 64. The ring 90 may be secured to the shaft 20 between the same flanges 16 and 18 that retain the inner races 14 of the bearings 12 in position. It will be understood that the flange 18 is not integral with the shaft 20 but is in the form of a clamping ring which may be threaded or otherwise removably attached to the shaft in order that the inner races of the bearing may be mounted thereon.

The seal 92 is similar in that the seal itself is axially slidable on a cylindrical surface provided by a ring 98 and is urged axially by a wave spring 100 which engages the downstream end of the seal element and urges it against the gear 70. Both of the seals 88 and 92 are the type referred to as reversed seals in which the lubricant reaches the seals from a point radially outward of the operative surface of the seal that engages with the cooperating ring or gear so that as the device operates with the ring or gear rotating, lubricant tends to be thrown away from the seal by centrifugal force.

The seal supporting ring 98 and the wave spring 100 may be secured as by bolts 102 to the element 58.

The bearings may be lubricated by any suitable means as, for example, by spray nozzles, not shown, that direct lubricant against bearings 12 and also by other spray nozzles which discharge fluid radially inward through openings 104 in the sleeve 72 so that lubricant reaches the space 106 between the sleeve 72 and the inner shaft 20, and lubricant from this space supplies bearings 78 and 30. The inner surface 108 of the high pressure shaft 28 is preferably divergent in a direction toward the bearing 30 such that any lubricant flowing from the space 106 past the bearing 30 is discharged by centrifugal force through openings 110 in the shaft 28.

Although the surface 108 is convergent it will be understood that the outer race 34 for the bearing 30 is necessarily cylindrical to permit the axial sliding movement that is provided for at this point.

Lubricant escaping through holes 110 in the shaft 28 flows along sleeve 72 to lubricate splines 74, and outwardly through oblique holes 114 in the sleeve to be thrown against the teeth on gears 68 and 70.

In addition to the accessory drive gear 70, other drives may be provided, as for example, the gear 116 secured to shaft 20 adjacent to bearing 12. Since this shaft is held against axial movement at this bearing, the gear may drive directly a gear, not shown, on a radial shaft similar to gear 68, the gear meshing with gear 116 being angularly offset from gear 68, as will be apparent.

It is to be understood that the invention is not limited to the specific embodiment herein illustrated and described, but may be used in other ways without departure from its spirit as defined by the following claims.

I claim:

1. In a gas turbine power plant having a low pressure compressor rotor and a separately rotatable high pressure compressor rotor, concentric shafts on which the compressor rotors are mounted, an accessory drive shaft having a bevel gear at one end, a bevel drive gear driven by the outer of said concentric shafts in mesh with said first gear, and a thrust bearing on the inner of said shafts and connected with said drive gear to take the axial thrust of said drive gear.

2. In a gas turbine power plant having a low pressure compressor rotor and a separately rotatable high pressure compressor rotor, concentric shafts both normally rotatable in the same direction and on which the compressor rotors are mounted, an accessory drive shaft between said rotors and having a bevel gear at one end, a bevel drive gear surrounding and driven by the outer of said concentric shafts and in mesh with said first gear, a thrust bearing on the inner of said shafts to take the axial thrust of said drive gear and a bearing between said shafts adjacent said thrust bearing.

3. In a gas turbine power plant having a low pressure compressor rotor and a separately rotatable high pressure compressor rotor, concentric shafts both normally rotatable in the same direction and on which the compressor rotors are mounted, a housing in which said shafts are supported, an accessory drive shaft between said rotors and having a bevel gear at one end, a bevel drive gear splined to the outer of said concentric shafts and in mesh with said first gear, a thrust bearing between said inner shaft and said drive gear to take the thrust of said drive gear and another bearing in said housing for supporting the inner shaft, said bearing being both a radial and a thrust bearing.

4. In a gas turbine power plant having a low pressure compressor rotor and a separately rotatable high pressure compressor rotor, concentric shafts both normally rotatable in the same direction and on which the compressor rotors are mounted, a housing in which said shafts are supported, an accessory drive shaft between said rotors and having a bevel gear at one end, a bevel drive gear splined to the outer of said concentric shafts and in mesh with said first gear, a thrust bearing between said inner shaft and said drive gear to take the thrust of said drive gear and another bearing in said housing for supporting the inner shaft, said bearing being both a radial and a thrust bearing, and a radial bearing between said inner and outer shafts.

5. In a gas turbine power plant having a low pressure compressor rotor and a separately rotatable high pressure compressor rotor, concentric shafts on which the compressor rotors are mounted, a housing between said rotors and having a thrust bearing supporting the inner of said shafts against axial movement, a sleeve splined to the outer shaft, a thrust bearing between the inner shaft and said sleeve to hold said sleeve against axial movement, an accessory drive gear on said sleeve, and a cooperating gear driven by said drive gear and rotatable in said housing.

6. In a gas turbine power plant having a low pressure compressor rotor and a separately rotatable high pressure compressor rotor, concentric shafts on which the compressor rotors are mounted, a housing between said rotors and having a thrust bearing supporting the inner of said shafts against axial movement, a sleeve splined to the outer shaft, a thrust bearing between the inner shaft and said sleeve to hold said sleeve against axial movement, an accessory drive gear on said sleeve and a cooperating gear in said housing, and a bearing between said shafts adjacent said sleeve and permitting relative axial movement between said shafts.

7. A gas turbine power plant having a low pressure compressor rotor and a separately rotatable high pressure rotor, concentric shafts to which said rotors are secured, a housing between said rotors, a bearing carried by said housing for supporting the inner of said shafts against axial movement, a thrust bearing on said inner shaft, a sleeve supported by said thrust bearing against axial movement and surrounding said shafts, splines on said outer shaft and on said sleeve by which the sleeve may be driven by said outer shaft, said splines providing axial movement between said sleeve and said outer shaft.

8. A gas turbine power plant having a low pressure compressor rotor and a separately rotatable high pressure rotor, concentric shafts to which said rotors are secured, a housing between said rotors, a bearing carried by said housing for supporting the inner of said shafts, a thrust bearing on said inner shaft, a sleeve supported by said thrust bearing against axial movement and surrounding said shafts, splines on said outer shaft and on said sleeve by which the sleeve may be driven by said outer shaft, said splines providing axial movement between said sleeve and said outer shaft, a gear on said sleeve, and an accessory drive shaft in said housing having an intermeshing gear.

9. A gas turbine power plant having a low pressure compressor rotor and a separately rotatable high pressure rotor, concentric shafts to which said rotors are secured, a housing between said rotors, a bearing carried by said housing for supporting the inner of said shafts, a thrust bearing on said inner shaft, a sleeve supported by said thrust bearing against axial movement and surrounding said shafts, splines on said outer shaft and on said sleeve by which the sleeve may be driven by said outer shaft, said splines providing axial movement between said sleeve and said outer shaft, said housing providing a chamber surrounding said bearings and sleeve, and seal means located in said housing adjacent to said first mentioned bearing.

10. A gas turbine power plant having a low pressure compressor rotor and a separately rotatable high pressure rotor, concentric shafts to which said rotors are secured, a housing between said rotors, a bearing carried by said housing for supporting the inner of said shafts, a thrust bearing on said inner shaft, a sleeve supported by said thrust bearing against axial movement and surrounding said shafts, splines on said outer shaft and on said sleeve by which the sleeve may be driven by said outer shaft, said splines providing axial movement between said sleeve and said outer shaft, said housing providing a chamber surrounding said bearings and sleeve, and seal means located in said housing adjacent to said first mentioned bearing and also adjacent the end of the sleeve remote from said first bearing.

References Cited in the file of this patent

UNITED STATES PATENTS 2,696,711    Marchant et al. _____ Dec. 14, 1954